(12) United States Patent
Lin et al.

(10) Patent No.: US 7,030,859 B2
(45) Date of Patent: Apr. 18, 2006

(54) FLAT-TYPE COMPUTER WITH KEYBOARD

(75) Inventors: Shui Yuan Lin, Taipei (TW); Chin Yueh Liu, Taipei (TW); Yen Yin Yu, Taipei (TW); Hsin-Chang Chen, Taipei (TW)

(3) Assignee: First International Computer Inc., Taipei (TW)

( * ) Notice: Subject to any disclaimer, the term of this patent is extended or adjusted under 35 U.S.C. 154(b) by 381 days.

(21) Appl. No.: 10/307,337

(22) Filed: Dec. 2, 2002

(65) Prior Publication Data

US 2004/0056843 A1    Mar. 25, 2004

(30) Foreign Application Priority Data

Sep. 20, 2002  (TW) .............................. 91214913 U (51) Int. Cl.
*G09G 5/00*    (2006.01)

(52) U.S. Cl. ...................................... 345/168; 345/169

(58) Field of Classification Search ........ 345/156–184; 361/681, 680; 248/919–923
See application file for complete search history.

(56) References Cited

U.S. PATENT DOCUMENTS

| | | | | |
|---|---|---|---|---|
| 5,241,303 A | * | 8/1993 | Register et al. | 345/168 |
| 5,268,817 A | * | 12/1993 | Miyagawa et al. | 361/681 |
| 6,005,767 A | * | 12/1999 | Ku et al. | 361/681 |
| 6,626,543 B1 | * | 9/2003 | Derryberry | 353/119 |
| 6,700,774 B1 | * | 3/2004 | Chien et al. | 361/680 |

* cited by examiner

*Primary Examiner*—Chanh Nguyen
*Assistant Examiner*—Srilakshmi K Kumar
(74) *Attorney, Agent, or Firm*—Browdy and Neimark, PLLC (57) ABSTRACT

A flat-type computer with a foldable keyboard has a main body with a chamber formed in rear side of the main body and a back cover to cover the chamber, the hosing connected with the rear side of the main body by a pivot, a keyboard, received in the chamber and a pivoting mechanism for connecting the main body and keyboard.

7 Claims, 10 Drawing Sheets

FLAT-TYPE COMPUTER WITH KEYBOARD

BACKGROUND OF THE INVENTION

1. Field of the Invention

The present invention relates to a flat-type computer with keyboard, and in particular, to a flat-type computer with foldable keyboard and functions of handwriting input and external keyboard input. Therefore, the computer is portable and easy to input data.

2. Description of the Prior Art

Figure 1:
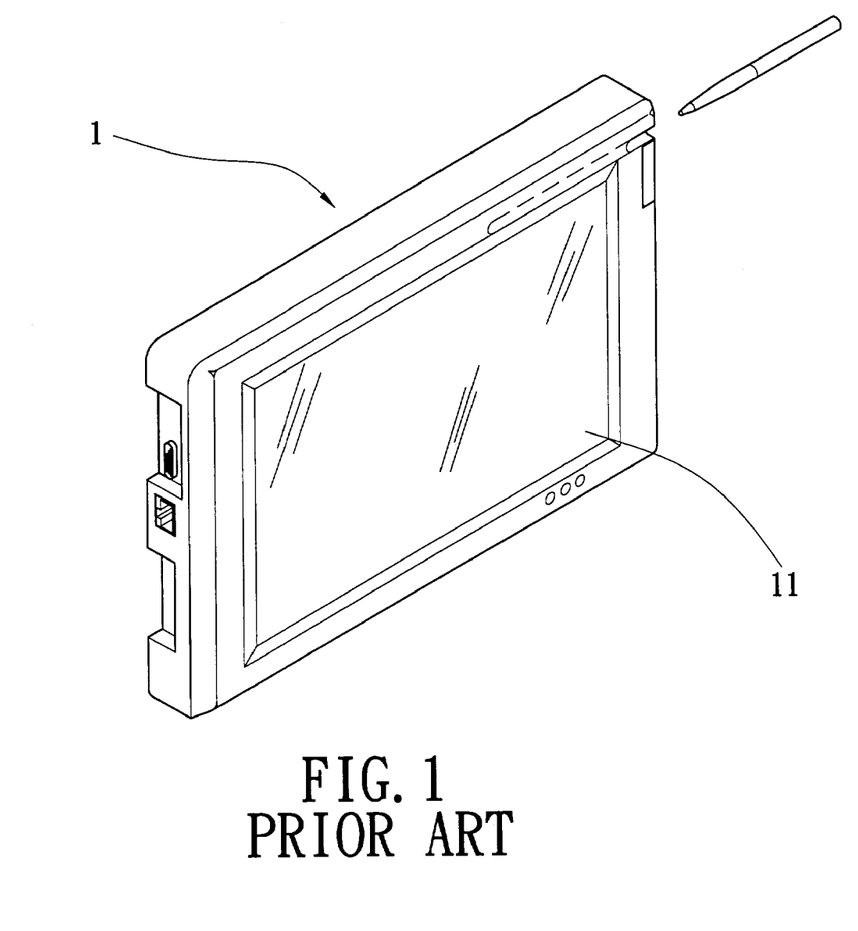
FIG. 1 is a perspective view of a conventional flat-type computer.

For the purpose of portability and convenience, a flat-type computer 1 has been produced, as shown in FIG. 1. A touch-screen display 11 is provided on the front of the flat-type computer 1 which includes a built-in processor, and plurality of interface connectors are formed in its sidewall. As described above, when using the flat-type computer 1, the users can touch or write on the touch-screen display 11 by stylus or touch pen to achieve the data input or manipulation of notebook or PDA.

However, because the flat-type computer 1 only employs stylus or touch pen to input data or manipulate, the flat-type computer 1 does not have the preferred input device. It is troublesome for users to input data in conventional flat-type computer. Even there are some following drawbacks: input speed of handwriting is slower than that of keyboard, and those who usually enter data by keyboard are not accustomed to handwriting. Besides, when inputting by handwriting or touch pen, a window must be provided which takes up some area of touch-screen display.

Conventional flat-type computer 1 is integrally formed with some components. Though the computer is portable, there are some inconveniences. Owing to lack of supporting means and its weight, the user must support the computer by their hands and cannot be placed on table. The user will complain of hand aching when he uses the computer in a long time.

In order to overcome the shortcomings of conventional device, the present invention provides a novel flat-type computer with foldable keyboard.

SUMMARY OF THE DISCLOSURE

It is an object of the present invention to provide a flat-type computer with a foldable keyboard and functions of handwriting input and keyboard input. Therefore, the computer is portable and easy to input data.

It is another object of the present invention to provide a flat-type computer with a foldable keyboard. The computer comprises a main body with a chamber formed in rear side of the main body and a back cover to cover the receiving space, the cover connected with the rear side of the main body by a pivot; a keyboard, received in the receiving space; a pivoting mechanism for connecting the main body and keyboard. The keyboard can be rotated forwardly or backwardly by the pivoting mechanism. When rotated forwardly, the keyboard can be accurately received in the chamber and the back cover closed, thereby locating the keyboard within the main body. When rotated backwardly, the keyboard can be moved out of the chamber and the user can manipulate it. Besides, the keyboard can be used to support the main body.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 2:
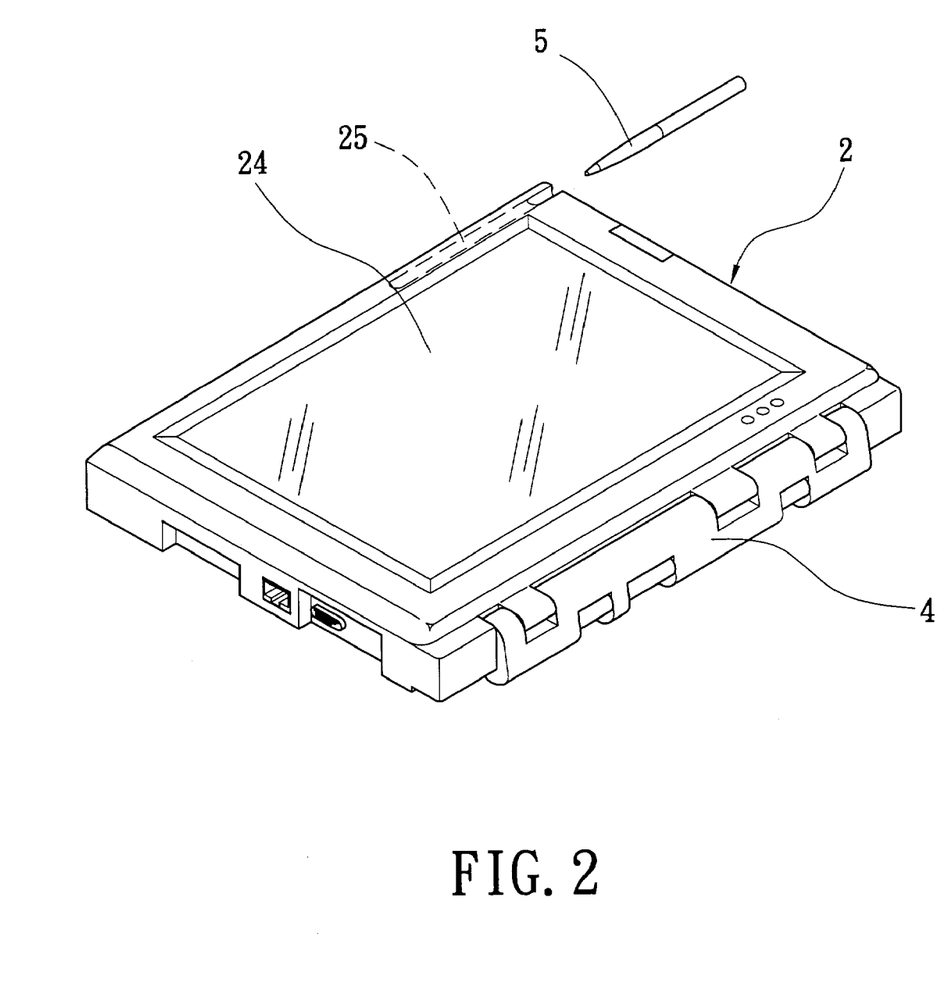
FIG. 2 is a front perspective view of a flat-type computer according to the present invention.
Figure 3:
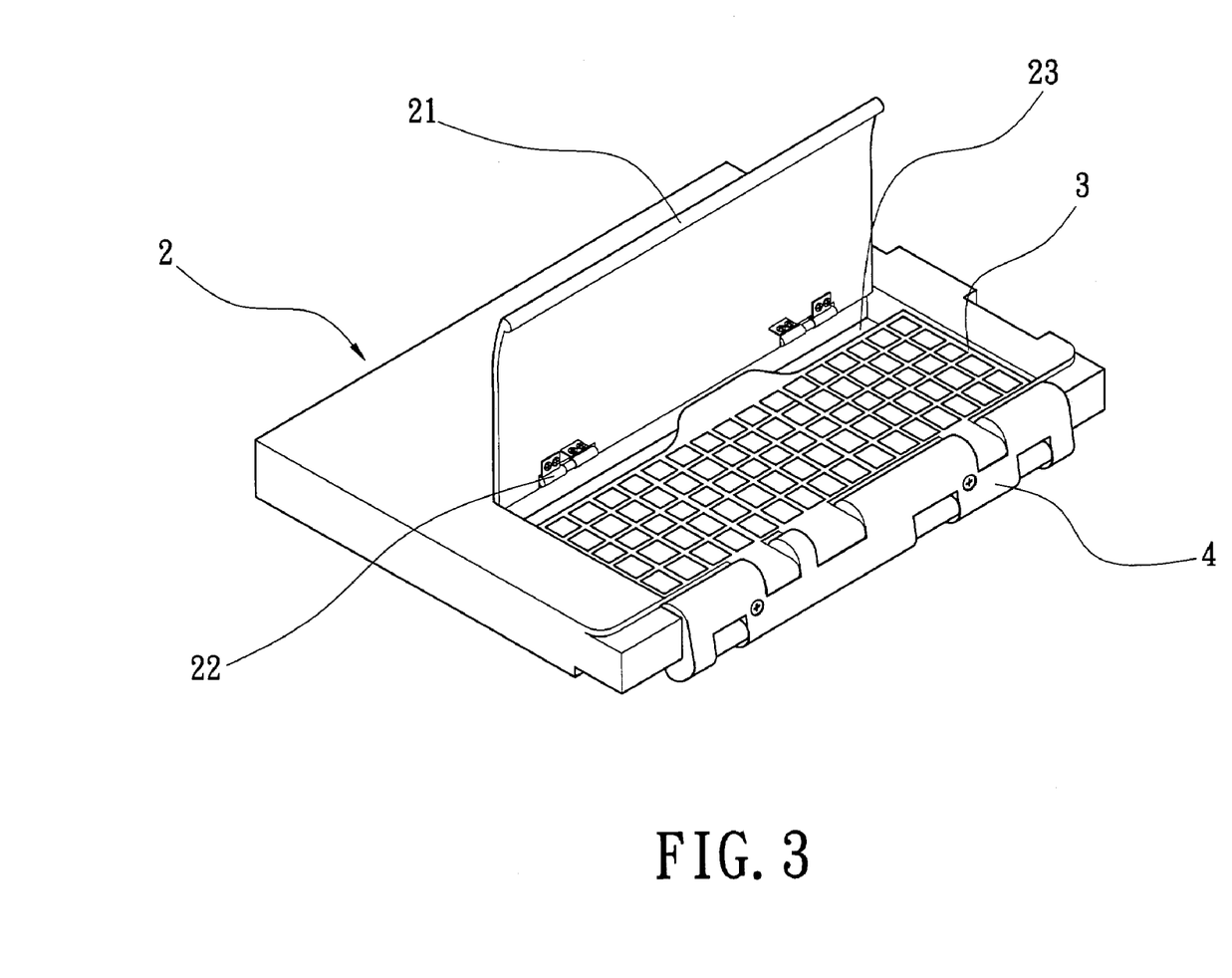
FIG. 3 is a rear perspective view of a flat-type computer according to the present invention showing a back cover being open.
Figure 4:
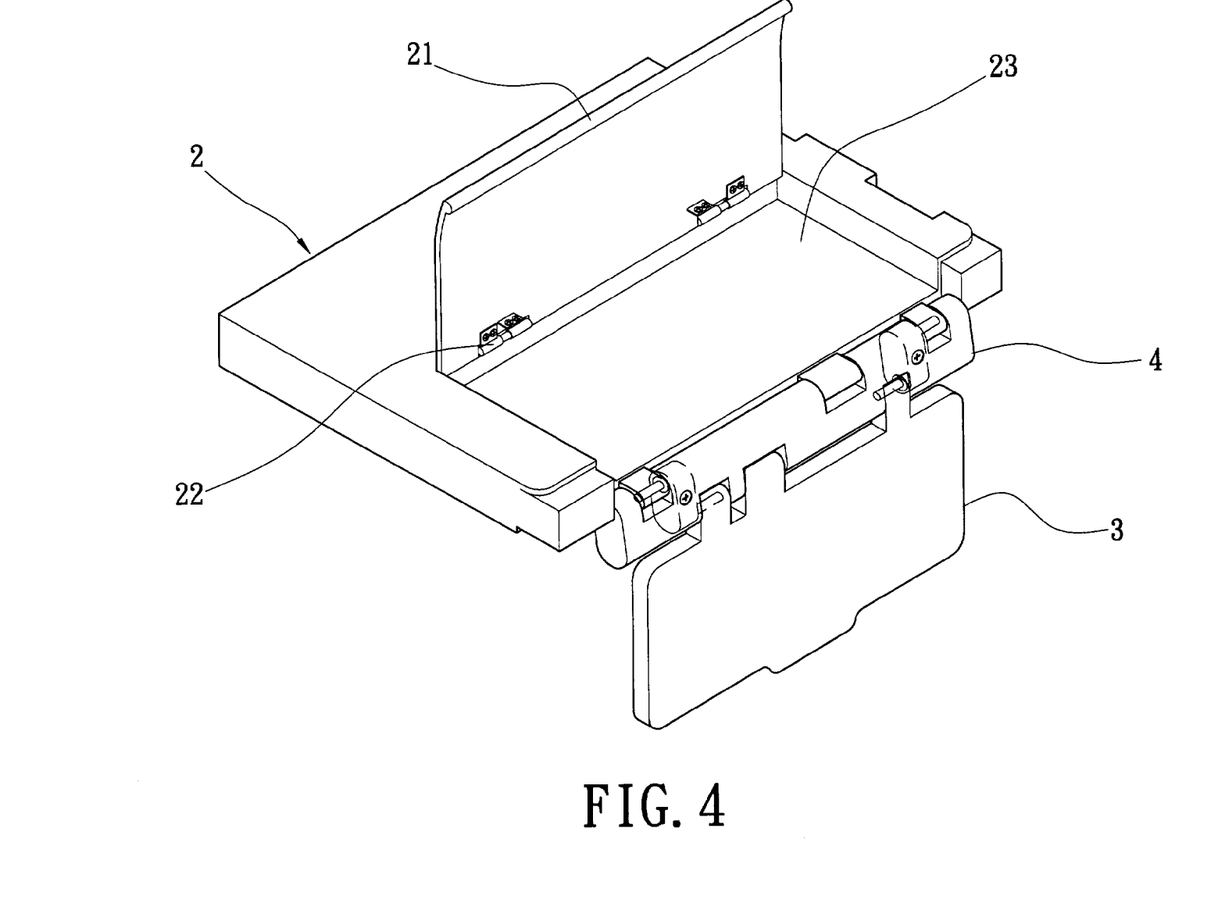
FIG. 4 is a rear perspective view of a flat-type computer according to the present invention showing a keyboard being moved out of a chamber.

Referring to FIGS. 2–4, the present invention relates to a flat-type computer with keyboard. The computer comprises a main body 2, a keyboard 3 and a pivoting mechanism 4 for connecting the main body 2 and the keyboard 3.

Referring to FIG. 4, the drawing shows a rear perspective view of a flat-type computer according to the present invention. A back cover 21 is connected with a back sidewall of the main body 2 by a pair of pivots 22. The back cover 21 can be opened or closed, and a chamber 23 corresponding to the back cover 21 is defined in the back sidewall of the main body 2 and is covered by the back cover 21.

The pivoting mechanism 4 with a pair of pivot, as shown in FIG. 4, and each end of the pivot is connected with a bottom edge of the main body 2 and a front edge of the keyboard 3 respectively. That is, pivoting mechanism 4 is connected therebetween, thereby the keyboard can be rotated through the pivoting mechanism 4. When the keyboard 3 is rotated backwardly, the keyboard is accurately received in the chamber 23, of the back sidewall of the main body 2 (as shown in FIG. 3). Meanwhile, the back sidewall of the main body 2 is covered by the back cover 21 so that the keyboard 3 can be placed within the main body 2, as shown in FIG. 2.

Figure 5:
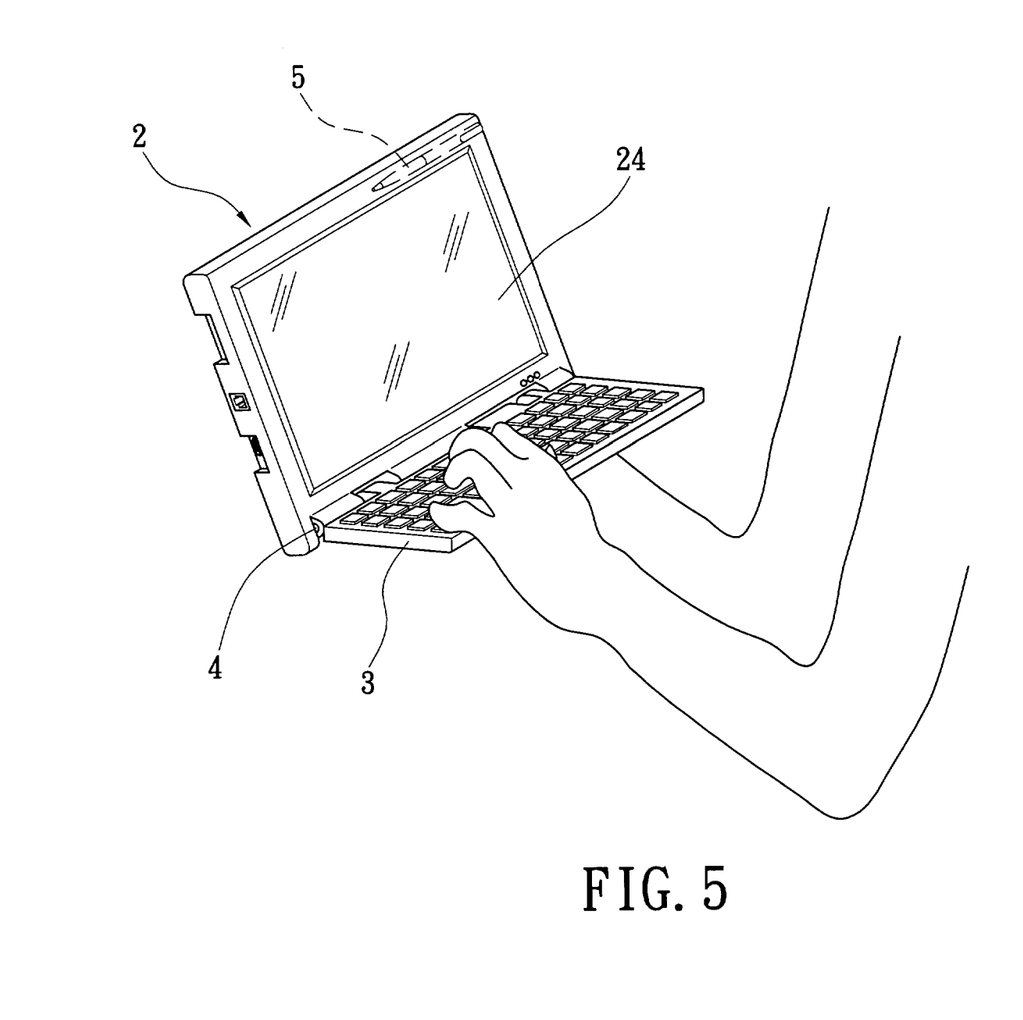
FIG. 5 is a perspective view of the flat-type computer of FIG. 4.

Referring to FIG. 2, because the keyboard is placed within the chamber 23 of the main body 2, the present invention is as portable as the conventional flat-type computer. A recess 25 is defined on the main body 2, and a stylus 5 (touch pen) can be placed in the recess. As shown in FIG. 5, the user can write on (touch) touch-screen display 24 on the opposite side from that where chamber 23 is located to enter data.

Referring to FIG. 3, when the user wants to input data via keyboard 3, the back cover 21 of the back sidewall of the main body 2 must be opened beforehand to find the keyboard 3 within the chamber 23. Referring to FIG. 4, the user can move the keyboard 3 out of the chamber 23 of the main body 2 by the pivoting mechanism 4 connected between the main body 2 and keyboard 3. Thus, the user can enter data via keyboard 3 while viewing touch-screen display 24.

FIG. 4 illustrates the joint of the pivot 22 and the pivoting mechanism 4. Because the joint is connected with the back cover 21 of the pivot 22 and keyboard 3 of the pivoting mechanism 4, the joint can be implemented in any orientation.

According to the present invention, there are several use modes (FIGS. 5, 5A and 5B):

Referring to FIG. 5, the user can support the flat-type computer by one hand and touch keyboard 3 entering data by the other hand. Because the user can enter data without touch pen or stylus and working window is not necessary to be called, it is very convenient for the users. Meanwhile, the back cover is closed and the keyboard 3 is supported by hand. Even if the user exerts too much force on keyboard 1, it is impossible for the keyboard 3 to fall from the hand.

Figure 6:
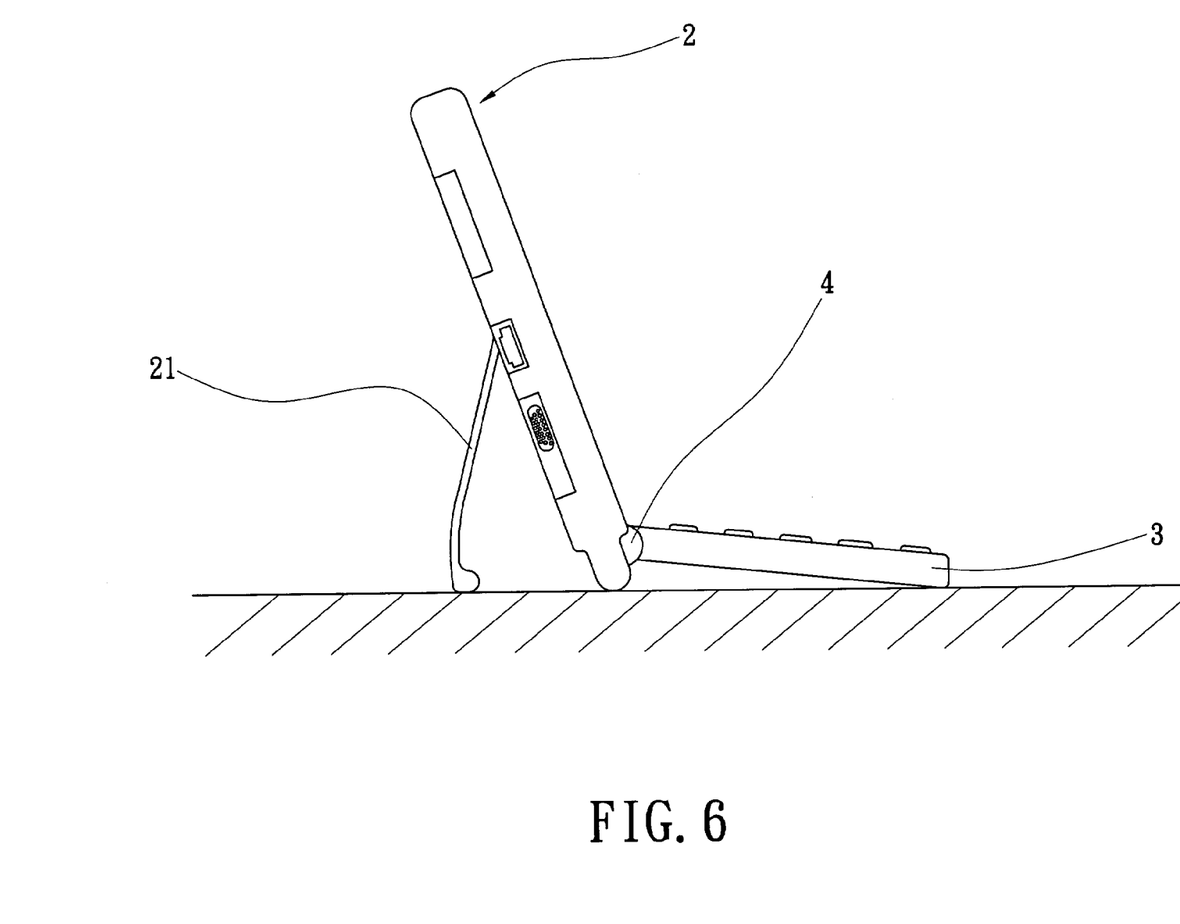
FIG. 6 is a side plane view of the flat-type computer of FIG. 4.

Referring to FIG. 6, the flat-type computer of the present invention can be placed on any plane and can be supported by the back cover 2 when opened. There is no need of supporting by hand. When, if the pivoting mechanism 4 is rotated toward the left side of FIG. 6, the keyboard 3 is tilted so that it is more convenient for the user to enter data.

Figure 7:
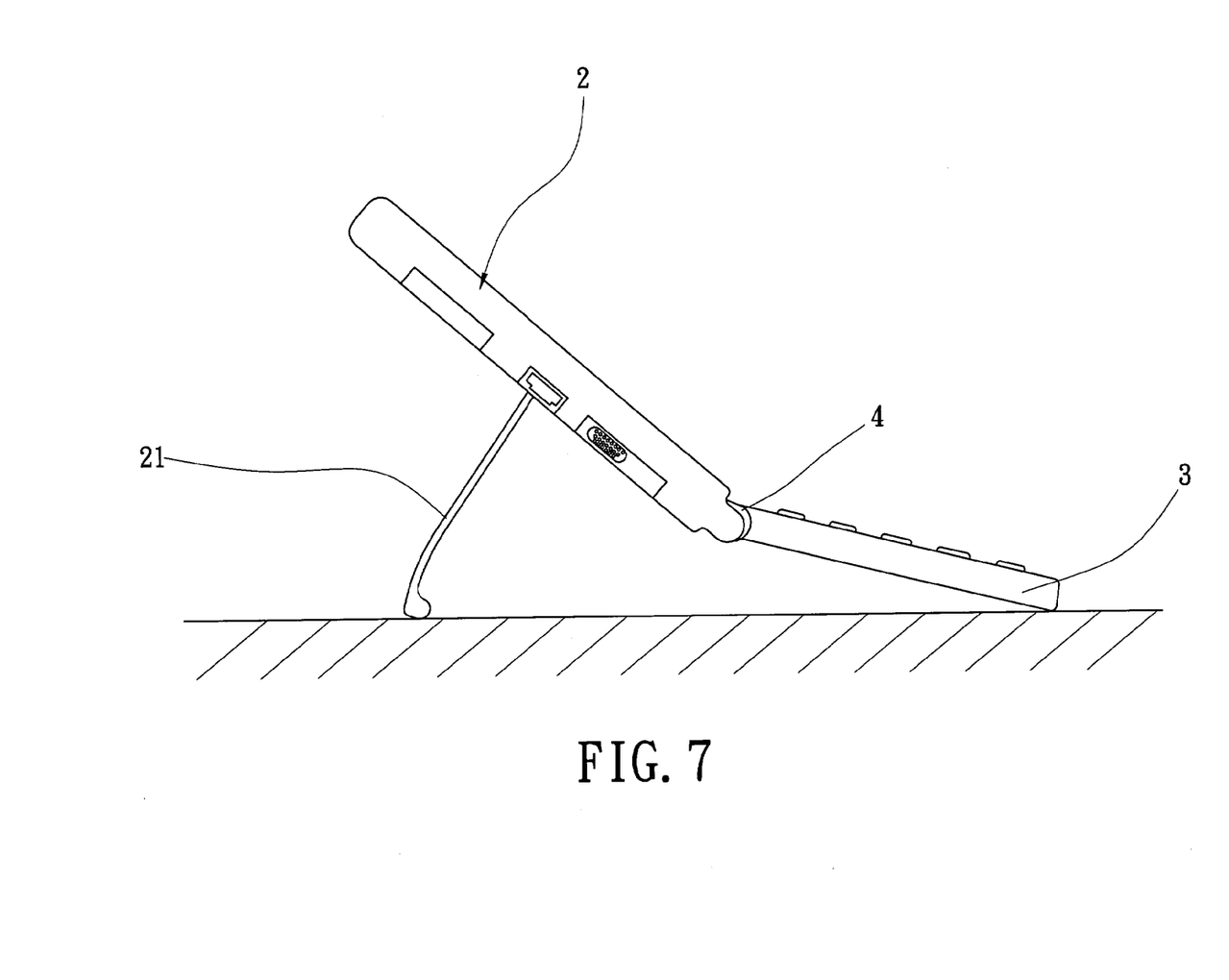
FIG. 7 is a side plane view of the flat-type computer of FIG. 4.

The flat-type computer of the present invention can be supported (not vertical) when the pivoting mechanism 4 is fixed by a screwdriver (not shown) and the back cover 21 opened to the position shown in FIG. 7.

Figure 8:
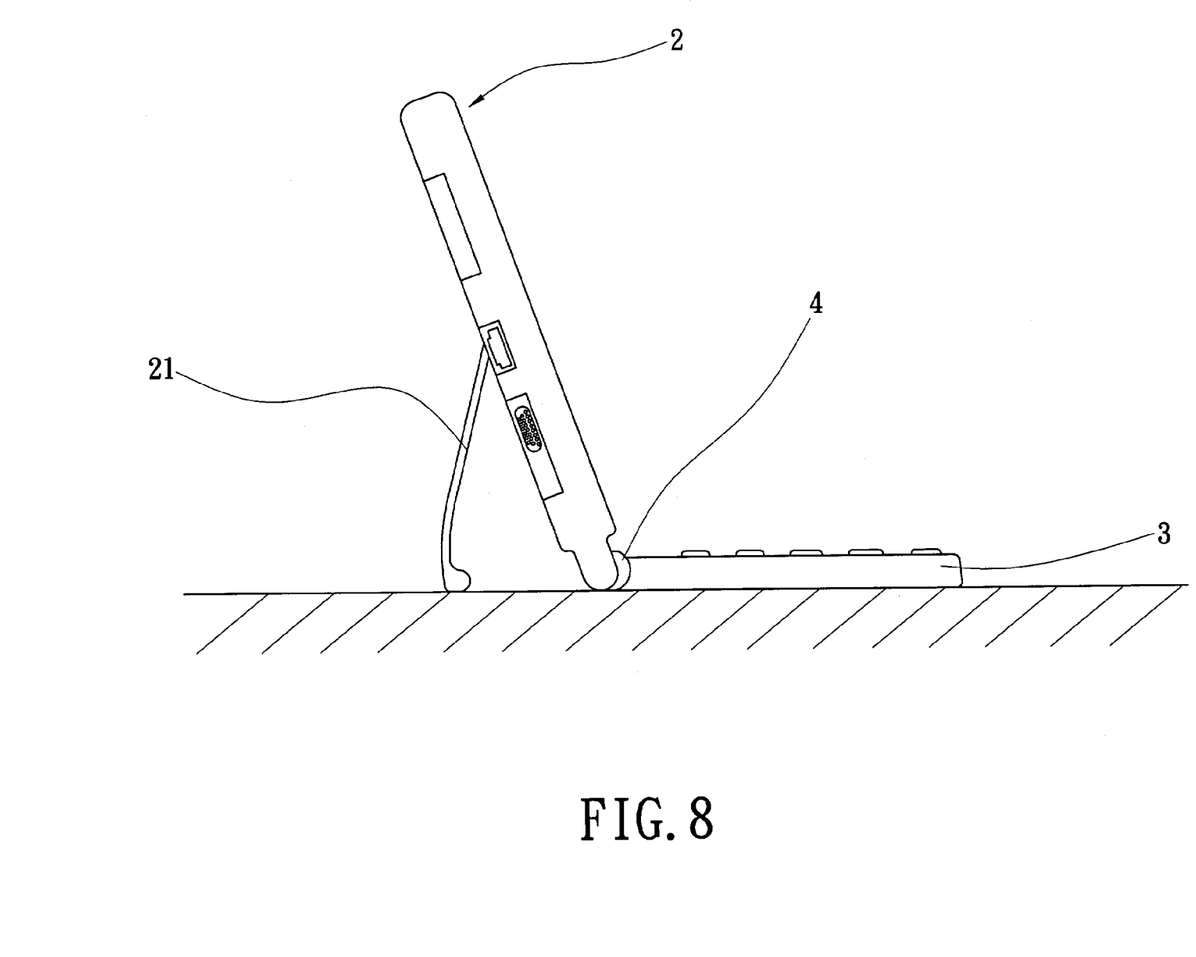
FIG. 8 is a side plane view of the flat-type computer of FIG. 4.

The mechanism 4 of the flat-type computer of the present invention can be rotated toward bottom side as shown in FIG. 8. That is, the keyboard 3 can be horizontally placed on the table (any plane) and the user can enter data via keyboard 3. Thus, as shown in FIGS. 6, 7 and 8, the tilt angle of the keyboard 3 can be changed by the user.

Figure 5A:
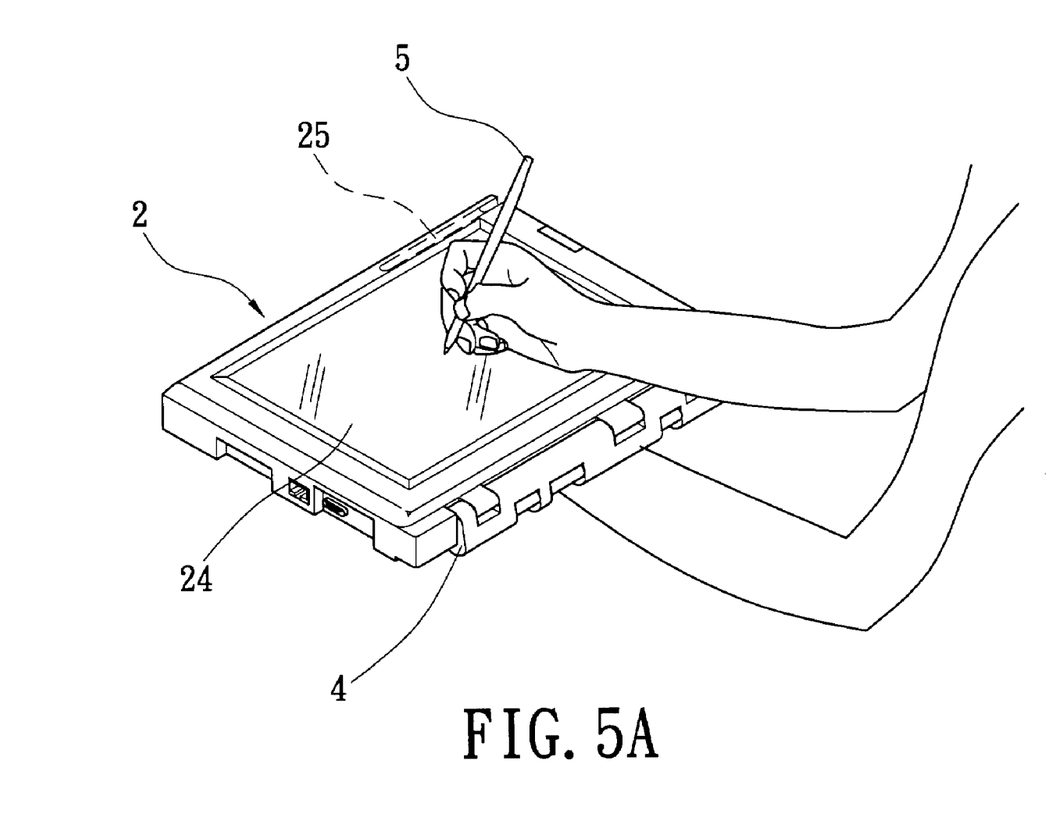
FIG. 5A is a view showing a usage of the flat-type computer of FIG. 2.
Figure 5B:
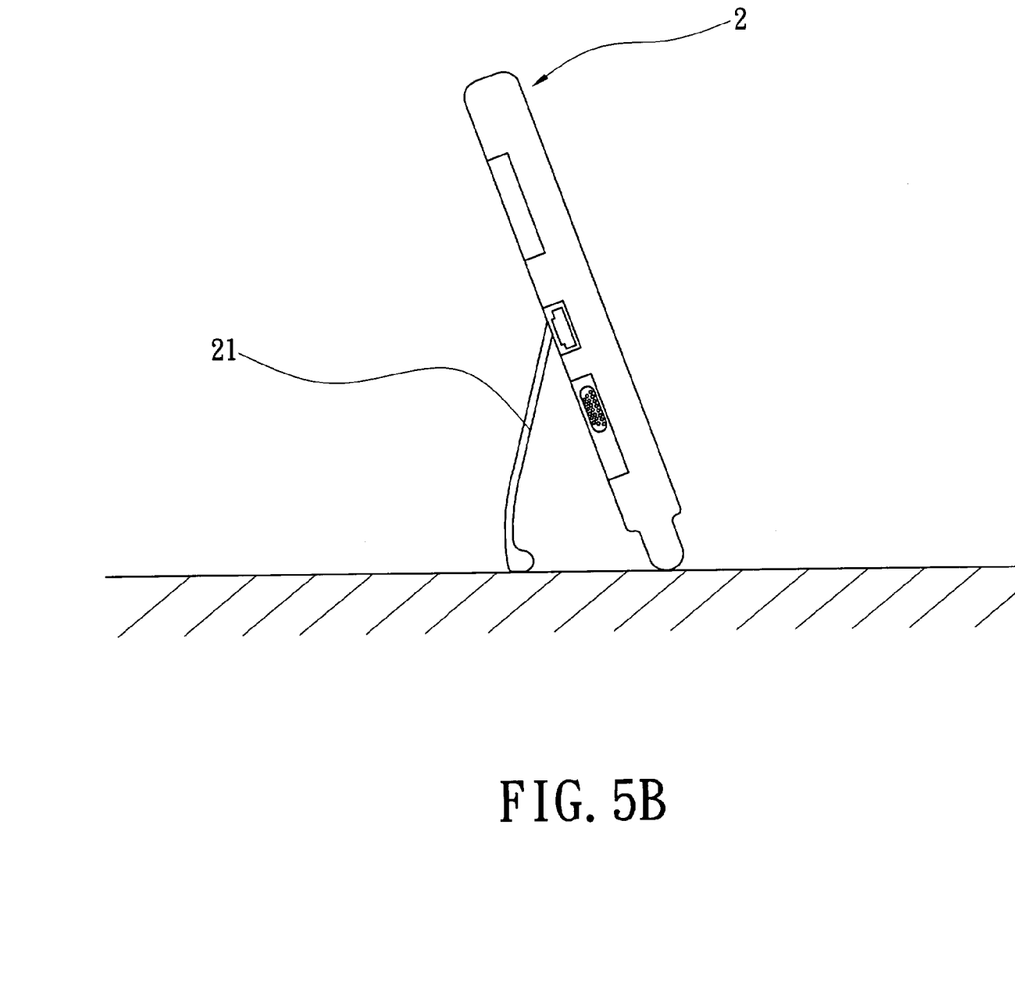
FIG. 5B is a view showing another usage of the flat-type computer of FIG. 2.

As shown in FIG. 5A, when the user does not need the keyboard 3, the keyboard 3 can be moved into the chamber 23 of the main body 2 and the user can write (touch) on the touch-screen display 24 by stylus 5 (or touch pen). If the user does not want to support the display 24 by hand, as shown in FIG. 5B, the user can open the back cover 21 to support the display 24 while the keyboard 3 is received in the chamber 23. It is more convenient for the user to enter data.

As described above, the keyboard 3 connected with the main body 2 can be moved in and out of the chamber 23. In addition, the back cover 21 received in the chamber 23 of the main body 2 can be opened to support the main body 2 on any plane. The pivoting mechanism 4 includes a pair of pivots and can be rotated forwardly or backwardly. As shown FIGS. 6–8, the tilt angle of the keyboard 3 can be adjusted in accordance with the users need. Furthermore, the keyboard 3 can also be moved out of and returned to the chamber 23. Thus, the user can write on and (touch) the touch-screen with stylus or touch pen. Otherwise, the user can enter data via keyboard. Thus, it is very convenient for user to use computer.

While the description above refers to particular embodiments of the present invention, it will be understood that many modifications may be without departing from the spirit thereof. The accompanying claims are intended to cover such modifications as would fall within the true scope and spirit of the present invention.

We claim:

1. A flat-type computer with a foldable keyboard, comprising:
   a main body having a display screen fixed on a front face thereof and a chamber defined on a back face thereof and a back cover pivotally covering the chamber, the back cover being pivotally connected to the back face of the main body through a plurality of pivots;
   a keyboard pivotally arranged within the chamber; and
   a pivoting mechanism for connecting the main body and the keyboard;
   wherein an opening of the chamber occupies less than the full area of the back face for receiving the keyboard;
   wherein the pivoting mechanism can fix the keyboard in at least two predetermined positions relative to the main body;
   wherein when the back cover is folded outward to expose the chamber and support the main body, the keyboard can be folded outward after the back cover is folded outward and used as an external keyboard for the flat-type computer.

2. The flat-type computer with a foldable keyboard as in claim 1, wherein the pivoting mechanism is connected between a bottom edge of the main body and a front edge of the keyboard.

3. The flat-type computer with a foldable keyboard as in claim 1, further comprising a stylus arranged on the main body by which a user directly perform input tasks on the display screen of the flat-type computer.

4. The flat-type computer with a foldable keyboard as in claim 1, further comprising a touch pen arranged on the main body by which a user directly performs input tasks on a display screen of the flat-type computer.

5. The flat-type computer with a foldable keyboard as in claim 1, wherein the pivoting mechanism has a pair of pivots.

6. The flat-type computer with a foldable keyboard as in claim 5, wherein a pivot of the pivoting mechanism is pivotally connected to the bottom edge of the main body and another pivot of the pivoting mechanism is pivotally connected to the front edge of the keyboard.

7. The flat-type computer with a foldable keyboard as in claim 1, wherein the display screen has a touch screen.

* * * * *